United States Patent

[11] 3,630,691

| [72] | Inventors | Paul Burnett<br>Lowell, Mass.;<br>Arthur H. Heuer, Shaker Heights, Ohio |
|---|---|---|
| [21] | Appl. No. | 769,410 |
| [22] | Filed | Oct. 21, 1968 |
| [45] | Patented | Dec. 28, 1971 |
| [73] | Assignee | The United States of America as represented by the Secretary of the Navy |

[54] METHOD OF GROWING MAGNESIUM OXIDE WHISKERS
4 Claims, No Drawings

[52] U.S. Cl. .................................................. 23/300,
23/294, 23/304, 23/201, 23/301 SP
[51] Int. Cl. ........................................................B01g 17/22,
C01f 5/02
[50] Field of Search.......................................... 23/304,
294, 300, 201, 301; 117/106; 148/1.6

[56] References Cited
UNITED STATES PATENTS

| 2,641,529 | 6/1953 | Austin .......................... | 23/304 |
| 3,245,761 | 4/1966 | Scott et al. ..................... | 23/304 |
| 3,326,636 | 6/1967 | Hubble et al. ................. | 23/201 |
| 3,371,993 | 3/1968 | Norwalk ........................ | 23/201 |
| 3,457,033 | 7/1969 | Gatti et al. ..................... | 23/301 SP |

*Primary Examiner*—Norman Yudkoff
*Assistant Examiner*—R. T. Foster
*Attorneys*—H. H. Losche, R. S. Sciascia and Paul S. Collignon ABSTRACT: A method of growing magnesium oxide whiskers by a vapor-liquid-solid mechanism comprising sintering fine-grained polycrystalline magnesium oxide having a selected impurity element therein and then annealing the sintered product whereby the impurity element forms a liquid solution with the magnesium oxide and crystal growth occurs by precipitation from the supersaturated liquid at the solid-liquid interface.

METHOD OF GROWING MAGNESIUM OXIDE WHISKERS

BACKGROUND OF THE INVENTION

The present invention relates to a method of growing magnesium oxide whiskers and more particularly to a method of growing magnesium oxide whiskers by a vapor-liquid-solid mechanism.

It has recently been shown that a vapor-liquid-solid method can be employed for the crystal growth of silicon. This vapor-liquid-solid method of growing silicon crystals is distinctly different from the commonly used vapor-solid technique in that in the vapor-liquid-solid method the crystal grows from a supersaturated liquid solution. The supersaturation of the vapor is kept small enough to suppress the vapor-solid deposition, yet is large enough to vapor deposit at the liquid alloy. For the growth of silicon crystals, metals such as gold, platinum and nickel have have been used as liquid-forming agents.

There are distinct advantages to be gained by a vapor-liquid-solid method, in comparison with a vapor-solid technique. The vapor-liquid-solid method provides greater deposition rates with an increase in deposition with decreasing deposition temperature. Silicon crystals have been grown at deposition temperatures as low as 800° C. Another advantage of the vapor-liquid-solid method resides in the fact that the liquid alloy protects the growing crystal at the solid-liquid interface from oxidation and also from foreign particles which could result in the formation of crystalline defects.

SUMMARY OF THE INVENTION

The present invention provides an improved method of growing magnesium oxide whiskers by producing ultra-fine-grained polycrystalline magnesium oxide and then annealing the product whereby extensive grain growth occurs. The polycrystalline magnesium oxide was produced by ultra-high-pressure sintering. The impurity for providing the liquid portion can be aluminum, calcium, or silicon.

It is therefore a general object of the present invention to provide an improved method of growing magnesium oxide whiskers. Other objects, advantages and novel features of the present invention will become apparent from the following detailed description of the invention.

DESCRIPTION OF THE PREFERRED EMBODIMENT

In the present invention, ultra-fine-grained $(0.05\mu)$ polycrystalline magnesium oxide is sintered at high pressure and temperature. If not already present, a suitable solution-forming agent (impurity) must be added to the magnesium oxide. A good solution-forming agent should readily dissolve magnesium oxide from the vapor or form a low-melting eutectic with magnesium oxide, have a low equilibrium vapor pressure, and provide a large contact angle promoting whisker growth. Elements meeting these criteria are aluminum, calcium, and silicon. Some commercial grades of magnesium oxides contain impurity and can be used without addition of an impurity. For example, an analysis of a commercial grade of magnesium oxide should, upon analysis, contain, by weight, 0.07 percent of calcium, 0.2 percent of silicon, and 0.2 percent of aluminum. Successful whiskers were grown with this commercial grade of magnesium oxide.

After the magnesium oxide is sintered, the product is annealed and, during annealing, crystal growth occurs. This mechanism of crystal growth is a two-step process. An impurity at the top of the growing whisker forms a liquid solution with the crystalline material and this solution is the preferred site for deposition from the supersaturated liquid at the solid-liquid interface. Unidirectional growth is a consequence of an anisotropy in the solid-liquid solution interfacial energy.

The feasibility of the growth of magnesium oxide whiskers was shown by a hot-stage electron microscopical study of ultra-fine-grained $(0.05\mu)$ polycrystalline magnesium oxide. The magnesium oxide was a commercial grade and was sintered at a pressure of 250,000 p.s.i. for a period of about 5 minutes, at a temperature of 900° C. The sintered material underwent extensive grain growth on annealing at temperatures as low as 1,000° C. Direct observation of this grain growth with the hot-stage attachment of a Siemens electron microscope was desired, however, extensive evaporation and subsequent condensation of the magnesium oxide occurred even before any power was applied to the hot stage. Many of the deposits were dumbbell-shaped whiskers which tended to coalesce at low hot-stage temperatures, but sizable whiskers were observed at a temperature of about 1,000° C. A step was present at the base of the whiskers and remained in the same position thus showing that growth was from the tip. The opacity of the spherical tip of the whisker was consistent with its being liquid. The extensive evaporation of magnesium oxide within the environment of the electron microscope is due to the well-known heating effect of the electron beam.

The growth of magnesium oxide whiskers while being observed by an electron microscope demonstrated that it is feasible to have crystal growth of magnesium oxide by a vapor-liquid-solid mechanism wherein aluminum, calcium or silicon can be used as a suitable solution-forming agent. Obviously many modifications and variations of the present invention are possible in the light of the above teachings.

We claim:

1. A method of growing magnesium oxide whiskers by a vapor-liquid-solid mechanism comprising:
   sintering at a pressure of about 250,000 p.s.i. and at a temperature of about 900° C., a product of ultra-fine-grained polycrystalline magnesium oxide having an impurity element added thereto selected from the group consisting of aluminum, calcium, and silicon, and then
   heating the sintered product at a temperature to form a supersaturated liquid solution, initially precipitating a magnesium oxide crystal from the supersaturated liquid solution in a manner to displace the solution aside and exhibiting a solid-liquid interface between the crystal and solution, and continuously precipitating magnesium oxide from the residual solution to progressively grow the magnesium oxide whisker.

2. A method of growing magnesium oxide whiskers as set forth in claim 1 wherein said impurity element is aluminum.

3. A method of growing magnesium oxide whiskers as set forth in claim 1 wherein said impurity element is calcium.

4. A method of growing magnesium oxide whiskers as set forth in claim 1 wherein said impurity element is silicon.

* * * * *

UNITED STATES PATENT OFFICE
CERTIFICATE OF CORRECTION
UNDER RULE 322

Patent No. 3,630,691          Dated    12-28-71

Inventor(s) PAUL BURNETT and ARTHUR H. HEUER

It is certified that error appears in the above-identified patent and that said Letters Patent are hereby corrected as shown below:

Column 2, line 5

"at the top of the growing"

should read

"at the tip of the growing"

Column 2, line 7

"site for deposition from the supersaturated liquid at the solid liquid interface."

should read

"site for deposition from the vapor. Crystal growth occurs by precipitation from the supersaturated liquid at the solid liquid interface."

Column 2, line 23 the word "sizable"

should be corrected to

"sizeable"

Signed and sealed this 27th day of June 1972.

(SEAL)
Attest:

EDWARD M. FLETCHER, JR.          ROBERT GOTTSCHALK
Attesting Officer                   Commissioner of Patents